United States Patent [19]

Ngoc Le

[11] Patent Number: 4,956,325

[45] Date of Patent: Sep. 11, 1990

[54] METHOD OF IMPREGNATING A SUPPORT MATERIAL

[75] Inventor: Binh Ngoc Le, Humble, Tex.

[73] Assignee: Merichem Company, Houston, Tex.

[21] Appl. No.: 327,557

[22] Filed: Mar. 23, 1989

[51] Int. Cl.$^5$ .............................................. B01J 31/12
[52] U.S. Cl. .................................. 502/163; 208/206; 208/207
[58] Field of Search ........................................ 502/163

[56] References Cited

U.S. PATENT DOCUMENTS

| | | | |
|---|---|---|---|
| 2,425,414 | 8/1947 | Bond | 23/184 |
| 2,606,099 | 8/1952 | Happel et al. | 208/235 |
| 2,740,749 | 4/1956 | Meguerian et al. | 208/235 |
| 2,853,432 | 9/1958 | Gleim et al. | 196/32 |
| 2,921,021 | 1/1960 | Urban et al. | 208/205 |
| 2,937,986 | 5/1960 | Lukk | 208/88 |
| 3,107,213 | 10/1963 | Cole et al. | 208/230 |
| 3,574,093 | 4/1971 | Strong | 208/206 |
| 3,758,404 | 9/1973 | Clonts | 208/263 |
| 3,839,487 | 10/1974 | Clonts | 585/724 |
| 3,977,829 | 8/1976 | Clonts | 422/256 |
| 3,992,156 | 11/1976 | Clonts | 248/263 |
| 4,090,954 | 5/1978 | Ward | 502/163 |
| 4,128,621 | 12/1978 | Homer | 502/163 |
| 4,159,964 | 7/1979 | Frame | 502/163 |
| 4,168,245 | 9/1979 | Carlson et al. | 502/163 |
| 4,248,694 | 2/1981 | Carlson | 208/207 |
| 4,290,917 | 9/1981 | Carlson | 502/163 |
| 4,318,825 | 3/1982 | Frame | 502/163 |
| 4,362,614 | 12/1982 | Asdigian | 208/235 |
| 4,461,897 | 7/1984 | Cobb | 502/163 |
| 4,562,300 | 12/1985 | LaFoy | 208/235 |

FOREIGN PATENT DOCUMENTS

| | | | |
|---|---|---|---|
| 0842222 | 5/1970 | Canada | 502/163 |
| 1121182 | 7/1968 | United Kingdom | 502/163 |

*Primary Examiner*—Patrick P. Garvin
*Assistant Examiner*—E. D. Irzinski
*Attorney, Agent, or Firm*—John R. Kirk, Jr.

[57] ABSTRACT

The present invention is directed to impregnating a support material with a metal phthalocyanine oxidation catalyst dissolved in monoethanol amine. More specifically, the invention is directed to the method of impregnating a catalyst support such as carbon particles with an aqueous solution of monoethanol amine wherein the monoethanol amine solvent is present in an amount from about 0.25% to about 50% by weight.

18 Claims, No Drawings

METHOD OF IMPREGNATING A SUPPORT MATERIAL

FIELD OF THE INVENTION

The present invention is directed to a method of impregnating a support material with a metal phthalocyanine oxidation catalyst. More specifically, the present invention is directed to impregnating catalyst beds with a metal phthalocyanine dissolved in an aqueous alkanol amine solution.

BACKGROUND OF THE INVENTION

It is well known and widely accepted in the petroleum refining industry to treat sour petroleum distillates with a supported metal phthalocyanine catalyst disposed as a fixed bed. The treating process is typically designed to effect the catalytic oxidation of offensive mercaptans contained in the sour petroleum distillates. Air is most often used as the oxidizing agent. The sour petroleum distillates most frequently treated are gasoline, including natural, straight-run, and cracked gasoline. Other distillates include fractions such as naphtha, kerosene, jet fuel, fuel oil, lube oil, and the like.

U.S. Pat. No. 2,853,432 discloses the use of metal phthalocyanine as the catalyst for treating sour petroleum distillates to effect the catalytic oxidation of mercaptans and other offensive sulphur-containing compounds. It is disclosed that the metal phthalocyanine may be in solution or utilized in association with a solid carrier.

U.S. Pat. No. 4,248,694 discloses a process for treating a mercaptan-containing sour petroleum distillate with a solid composite prepared by impregnating high-density activated charcoal particles with a metal phthalocyanine catalyst. This patent discloses that the impregnation from a methanol solution had been used but found objectionable due to the relative expense, toxicity, and difficulty in disposing of the methanol solution. Specifically, this patent is directed to utilizing ammonia or ammonium hydroxide as the solvent for the metal phthalocyanine catalyst when impregnating the solid composite catalyst.

SUMMARY OF THE INVENTION

The present invention is directed to impregnating a support material with a metal phthalocyanine oxidation catalyst dissolved in an alkanol amine solution. More specifically, the invention is directed to the method of impregnating a catalyst support such as carbon particles with an aqueous solution of an ethanol amine wherein the ethanol amine is present in an amount from about 0.25% to about 50% by weight.

DETAILED DESCRIPTION OF THE INVENTION

The present invention is directed to the solvent used in the method for impregnating a support material with a metal phthalocyanine oxidation catalyst. More specifically, an ethanol amine is used as a solvent to dissolve the metal phthalocyanine for impregnating support materials such as activated carbon. The support material impregnated with the phthalocyanine oxidation catalyst is used in processes for treating a mercaptan containing sour petroleum distillate at oxidation conditions.

The solvents which have been used heretofore with the metal phthalocyanine oxidation catalysts such as methanol and ammonia are objectionable due to the difficulties posed for people in handling these materials. Both have objections in that they are toxic or will cause burns to humans in the handling or inhalation of such solvents. The present invention is directed to suitable solvents which do not have the objections of methanol and ammonia but have been found to be good solvents for the solution impregnating a support material or fixed bed with the metal phthalocyanine oxidation catalysts.

Alkanol amines are used in the present invention as the solvent for the metal phthalocyanine oxidation catalysts. The preferred alkanol amines are the ethanol amines and most specifically the monoethanol amines. Monoethanol amine is a colorless liquid which is readily available in the refinery. Monoethanol amine has a boiling point of about 171° and a density of 1.04. It has been found according to the present invention that it is a suitable solvent for the metal phthalocyanine compounds which are active oxidation catalysts. Monoethanol amine is a solvent which is used within the refinery industry and has not posed the handling problem of other solvents.

According to the present invention, it has been found that an alkanol amine, specifically an ethanol amine such as monoethanol amine, will dissolve the metal phthalocyanine compounds sufficiently to carry these catalyst materials to the support material but the metal phthalocyanine compounds will come out of solution onto the support material impregnating the base to form a suitable supported catalyst of the metal phthalocyanine. The support materials may be chosen from a wide variety of materials of carbon particle materials but are most normally an activated charcoal particle. The commonly used activated charcoal particles will have an apparent bulk density of 0.2 to 0.6 grams per cubic centimeter. These materials when impregnated with the metal phthalocyanine oxidation catalyst are utilized in a fixed bed through which the petroleum distillate is passed under oxidation conditions. The metal phthalocyanine compounds which may be used as oxidation catalysts are, for example, cobalt, copper, hafnium, iron, magnesium, manganese, molybdenium, nickel, palladium, platinum, silver, tantalum, tin, titanium, vanadium and zinc phthalocyanine, and the like. Derivatives of the metal phthalocyanine may also be employed such as the sulfonated or carboxylated derivatives, for example, cobalt phthalocyanine monosulfonate, cobalt phthalocyanine disulfonate, or mixtures thereof.

In most instances the metal phthalocyanine catalysts are placed on support materials, such as activated charcoal, which are in fixed beds. Depending upon the capacity of the unit treating the sour petroleum distillate, these fixed beds may be relatively small or of a substantial size. After loading the bed of the unit with the support material, the preferred method of the present invention is directed to impregnating the support material with an aqueous solution of a metal phthalocyanine, preferably cobalt phthalocyanine, in an alkanol amine, preferably monoethanol amine. The solution will contain between 0.25% to 50% by weight alkanol amine. The solution will usually contain less than 25% and preferably between 1% to 5% by weight ethanol amine, specifically monoethanol amine. The preferred solution containing 1 to 5% by weight monoethanol amine will contain about 250 to about 1000 parts per million of the metal phthalocyanine, specifically cobalt phthalocyanine catalyst, while a solution containing 50% by weight ethanol amine may contain up to 3000 ppm of metal phthalocyanine. This preferred solution is pumped through the bed in a pump around mode either from the bottom to the top or the top to the bottom. As the solution is pumped through the support material, the metal phthalocyanine catalyst impregnates the support material and the concentration of the metal phthalocyanine in the aqueous solution starts to fall. Periodically additional metal phthalocyanine is added to the solution to bring the level of the metal phthalocyanine catalyst back up to a concentration. As a specific illustration, a solution of about 1.4% by weight of monoethanol amine may contain about 400 ppm of cobalt phthalocyanine. The pump around process is continued until sufficient metal phthalocyanine is impregnated on the solid support material. That level may range from about 0.05 to about 0.1 pounds of catalyst per cubic foot of bed. A preferred level of metal phthalocyanine oxidation catalyst on the support may be about 0.08 to about 0.09 pounds of catalyst per cubic foot of bed.

The catalyst bed is impregnated with the active metal phthalocyanine compound or derivates in the start-up of a unit used for treating sour petroleum distillates. The bed may also be re-impregnated after a certain time of operation of the unit. After the catalyst bed has been impregnated with the active metal phthalocyanine catalyst, the bed is then treated with a caustic material, usually sodium or potassium hydroxide solutions, which is used in the cataltyic oxidation processes together with an oxidizing agent such as oxygen or oxygen-containing gases, usually air. Over a period of time, a catalyst bed may be recausticized and steamed several times or more until the activity of the catalyst can no longer be reactivated.

A characteristic found when impregnating a catalyst bed with monoethanol amine as the solvent has been a certain impregnation uniformity. The monoethanol amine thus not only acts as a solvent for the metal phthalocyanine in the aqueous solution used for impregnating the support materials but seems to assist in impregnating the bed more uniformly. Solvents that deposit the metal phthalocyanine catalyst too readily on the support material will give a nonuniform catalyst profile within the bed and incomplete bed utilization.

The present invention is illustrated by the following specific example and comparison.

EXAMPLE 1

A water solution containing about 1.4% monoethanol amine was made up to use as a solvent. To 300 cc of solvent, cobalt phthalocyanine was added until 400 ppm cobalt phthalocyanine was present. The aqueous solution was circulated through a 100 cc carbon bed for about 30 minutes. About 50% of the cobalt phthalocyanine was transferred to the bed. Additional cobalt phthalocyanine catalyst was added to the solution to bring the cobal phthalocyanine level back up to the 400 ppm concentration. The reconstituted solution was again circulated through the bed for 30 minutes. This procedure was continued until the cobalt phthalocyanine level on the carbon bed reached a level of about 0.09 lbs of catalyst per cubic foot of charcoal. To reach this level took approximately 6.5 to 7 hours to complete.

The impregnated bed with the cobalt phthalocyanine was operated around the clock at 100° F. with a dilute kerosene feed containing about 60 ppm RSH-S. The bed lasted for about six weeks before the mercaptan level in the product which during steady-state conditions had 5 to ppm mercaptan (RSH-S) exceeded a "break-through level" of 10 ppm, "break-through level" being an arbitratory level set by product specification for each operation and is set as an indication that a substantial increase in the amount of mercaptans are in the product which are not being oxidized and treated.

The bed was then treated with caustic to reactivate the catalyst bed and it took about three weeks for the bed to again reach mercaptan break-through level (10 ppm). The bed was recausticized for the third time and the bed remained active for another two to three weeks.

COMPARATIVE EXAMPLE

To compare the activity of a charcoal bed impregnated with monoethanol amine according to the present invention, a second bed was impregnated with a dilute ammonia water solution (0.2% NH$_4$OH) containing approximately the same catalyst concentration of cobalt phthalocyanine (approximately 400 ppm). The same impregnation procedure was used with the dilute ammonia water solution as was used with the monoethanol amine solution. About three bed volumes of the solvent containing about 400 ppm cobalt phthalocyanine catalyst were circulated through the bed for about 30 minutes. Additional catalyst was then added after each 30 minute period and the procedure continued until the catalyst impregnated on the bed reached the level of about 0.09 lbs catalyst per cubic foot of charcoal.

With the ammonia water solution of the cobalt phthalocyanine catalyst, a greater amount of the cobalt phthalocyanine was deposited in any 30 minutes period than when the monoethanol amine solution was used. It took about 4.5 hours for the 0.09 lbs of cobalt phthalocyanine catalyst to be impregnated on the 1 cubic foot of charcoal in the case of the ammonia solution.

When the bed was operated around the clock at 100° F. with dilute kerosene feed containing about 60 ppm RSH-S, the bed lasted for only about four weeks before the residual mercaptan level in the product reached a break-through level of 10 ppm.

After the bed was recausticized, it took only about two weeks for the bed impregnated with the ammonia solution to reach the mercaptan break-through level. On recausticization for the third time, the bed remained active for another two to three weeks.

What is claimed:

1. A process for impregnating a support material with a metal phthalocyanine oxidation catalyst which comprises:
    contacting said support material with an aqueous impregnating solution of said metal phthalocyanine dissolved in a monoalkanol amine.

2. A process according to claim 1 wherein said aqueous solution contains 1% to 5% by weight monoalkanol amine.

3. A process according to claim 1 wherein said aqueous impregnating solution is circulated through a bed of said support material.

4. A process according to claim 3 wherein said circulation continues until the catalyst level on said bed reaches the desired level of pounds of catalyst per cubic foot of bed.

5. A process according to claim 1 wherein said support material is carbon.

6. A process according to claim 1 where said support material is charcoal.

7. A process according to claim 1 wherein said charcoal has an apparent bulk density of from 0.2 to 0.6 grams per cubic centimeter.

8. A process for impregnating a support material with a metal phthalocyanine oxidation catalyst which comprises:
   contacting said support material with an aqueous impregnating solution of said metal phthalocyanine dissolved in an monoethanol amine.

9. A process according to claim 8 wherein said aqueous solution contains 1% to 5% by weight monoethanol amine.

10. A process according to claim 8 wherein said aqueous impregnating solution is circulated through a bed of said support material.

11. A process according to claim 10 wherein said circulation continues until the catalyst level on said bed reaches the desired level of pounds of catalyst per cubic foot of bed.

12. A process according to claim 8 wherein said support material is carbon.

13. A process according to claim 8 where said support material is charcoal.

14. A process according to claim 8 wherein said charcoal has an apparent bulk density of from 0.2 to 0.6 grams per cubic centimeter.

15. The process of claim 8 further characterized in that the metal phthalocyanine is cobalt phthalocyanine.

16. A liquid composition which comprises;
    water,
    monoethanol amine and
    metal phthalocyanine 17. A composition according to claim 16 wherein said monoethanol amine is present in an amount of 1% to 5% by weight.

18. A composition according to claim 17 wherein said metal phthalocyanine is cobalt phthalocyanine.

* * * * *